United States Patent [19]

Nusser et al.

[11] E Re. 29,445

[45] Reissued Oct. 18, 1977

[54] PUMP AND ELECTRIC DRIVE MOTOR UNIT

[75] Inventors: Hermann Nusser, Asperg, Germany; Hendricus van Eeden, Johannesburg, South Africa; Jürgen Ebert, Stuttgart-Ost, Germany

[73] Assignee: Robert Bosch GmbH, Stuttgart, Germany

[21] Appl. No.: 663,812

[22] Filed: Mar. 4, 1976

Related U.S. Patent Documents

Reissue of:

[64] Patent No.: 3,801,231
Issued: Apr. 2, 1974
Appl. No.: 282,780
Filed: Aug. 22, 1972

[30] Foreign Application Priority Data

Aug. 24, 1971 Germany ..... 2142258

[51] Int. Cl.[2] ..... F04B 17/00

[52] U.S. Cl. ..... 417/366; 417/423 R; 403/298; 403/359; 310/43

[58] Field of Search ..... 417/366, 410, 423 R; 415/143; 403/298, 359; 310/43, 75 D, 75 R; 64/27 R, 9

[56] References Cited

U.S. PATENT DOCUMENTS

| | | | |
|---|---|---|---|
| 1,189,180 | 6/1916 | Sinback | 310/75 D |
| 2,397,905 | 4/1946 | Acton et al. | 403/359 |
| 2,846,951 | 8/1958 | Metral et al. | 417/410 |
| 3,259,072 | 7/1966 | Carpenter | 415/143 |
| 3,318,249 | 5/1967 | Loeser | 417/410 |
| 3,355,910 | 12/1967 | Pruner | 64/27 R |
| 3,463,950 | 8/1969 | Schadlich | 310/75 R |
| 3,588,284 | 6/1971 | Sturlason et al. | 417/410 |
| 3,754,844 | 8/1973 | Nusser et al. | 417/423 R |
| 3,836,291 | 9/1974 | Bottcher et al. | 417/423 R |
| 3,870,910 | 3/1975 | Fussner | 417/423 R |
| 3,897,179 | 7/1975 | Fussner et al. | 417/423 R |
| 3,938,398 | 2/1976 | Bloom et al. | 403/359 |
| 3,969,044 | 7/1976 | Fussner et al. | 417/366 |

FOREIGN PATENT DOCUMENTS

| | | | |
|---|---|---|---|
| 1,041,153 | 10/1953 | France | 417/423 R |
| 1,204,003 | 1/1960 | France | 417/423 R |
| 1,087,002 | 8/1960 | Germany | 417/423 R |
| 949,070 | 2/1964 | United Kingdom | 417/423 R |
| 1,204,165 | 9/1970 | United Kingdom | 417/423 R |

*Primary Examiner*—C. J. Husar
*Attorney, Agent, or Firm*—Michael J. Striker

[57] ABSTRACT

There is described a pump assembly which, in a unitary structure, comprises a pump proper and an electric pump drive motor, both contained in a common housing. A metal disc, forming part of the pump housing, is positioned at one end inside the common housing and supports a stationary shaft extending coaxially with and along the entire length of the pump assembly. On the stationary shaft journals the armature of the drive motor and the pump rotor member rotationally coupled to the armature.

13 Claims, 3 Drawing Figures

PUMP AND ELECTRIC DRIVE MOTOR UNIT

Matter enclosed in heavy brackets [ ] appears in the original patent but forms no part of this reissue specification; matter printed in italics indicates the additions made by reissue.

BACKGROUND OF THE INVENTION

This invention relates to a pump structure, particularly a fuel delivery pump including, in a unitary assembly, a pump proper and an electromotor and having a housing which is filled with the flow medium. The rotary armature of the electromotor is submerged in the flow medium which also serves as a lubricant for the bearings of the rotary components.

A pump of the aforenoted type, as disclosed, for example, in U.S. Pat. No. 3,259,072, comprises a housing which is made of a synthetic material and which is formed of a plurality of cylinders in an end-to-end arrangement. The electromotor is located in the cylindrical main portion of the housing. One side of the latter is bounded by a closure which contains the electric terminals and the support for the carbon brushes. To the other end of the housing there is attached a pump housing which is also made of a synthetic material and which has a diameter greater than that of the motor housing. The pump housing accommodates a centrifugal pump and has an inlet port and an outlet port. The motor chamber is filled with the flow medium of intermediate pressure through particular ports provided in the separating wall between the motor chamber and the pump chamber for lubricating the bearings and cooling the armature of the motor.

In the manufacture of the aforeoutlined pump, synthetic material is used to a significant extent. Since synthetic materials in general have only low strength values that are far below those of metallic parts, the components of this pump have to be of very substantial thickness resulting in a very bulky overall structure.

OBJECT, SUMMARY AND ADVANTAGES OF THE INVENTION

It is an object of the invention to provide an improved fuel delivery pump of the aforenoted type which is of greatly reduced size despite an extensive use of parts made of synthetic material.

Briefly stated, according to the invention the pump-and-motor unit has a base body comprising a metal disc and a stationary metal shaft press-fitted at one end into the metal disc. The metal disc, which is disposed at one end of the unit, forms part of a pump housing accommodating a rotor member. On the stationary shaft there journals, axially spaced from the pump housing, the armature of the electric drive motor. The rotor member is rotationally coupled to the armature. The entire pump-and-motor unit is contained in an external housing of very simple, preferably rotationally symmetrical configuration.

The aforeoutlined structure has the advantage that the pump component, which is exposed to significant wear, is built of materials which excel in wear resistance. All other parts which are only slightly, if at all, exposed to wear may be made of easily machinable materials having lesser strength (such as synthetic materials). Since the last-named parts are supported by the stationary metal shaft and the external housing and, further, since they themselves do not perform any supporting or carrying function, they may be relatively thin-walled. The metal (particularly steel) parts, because of their simple shape, can be sintered components. The entire pump-and-motor unit may be of very small dimensions, although it is made to a significant extent — particularly the very expensive shaped parts — of synthetic material.

The invention will be better understood, as well as further objects and advantages become more apparent, from the ensuing detailed specification of two exemplary embodiments taken in conjunction with the drawing.

DESCRIPTION OF THE EMBODIMENTS

Figure 1:
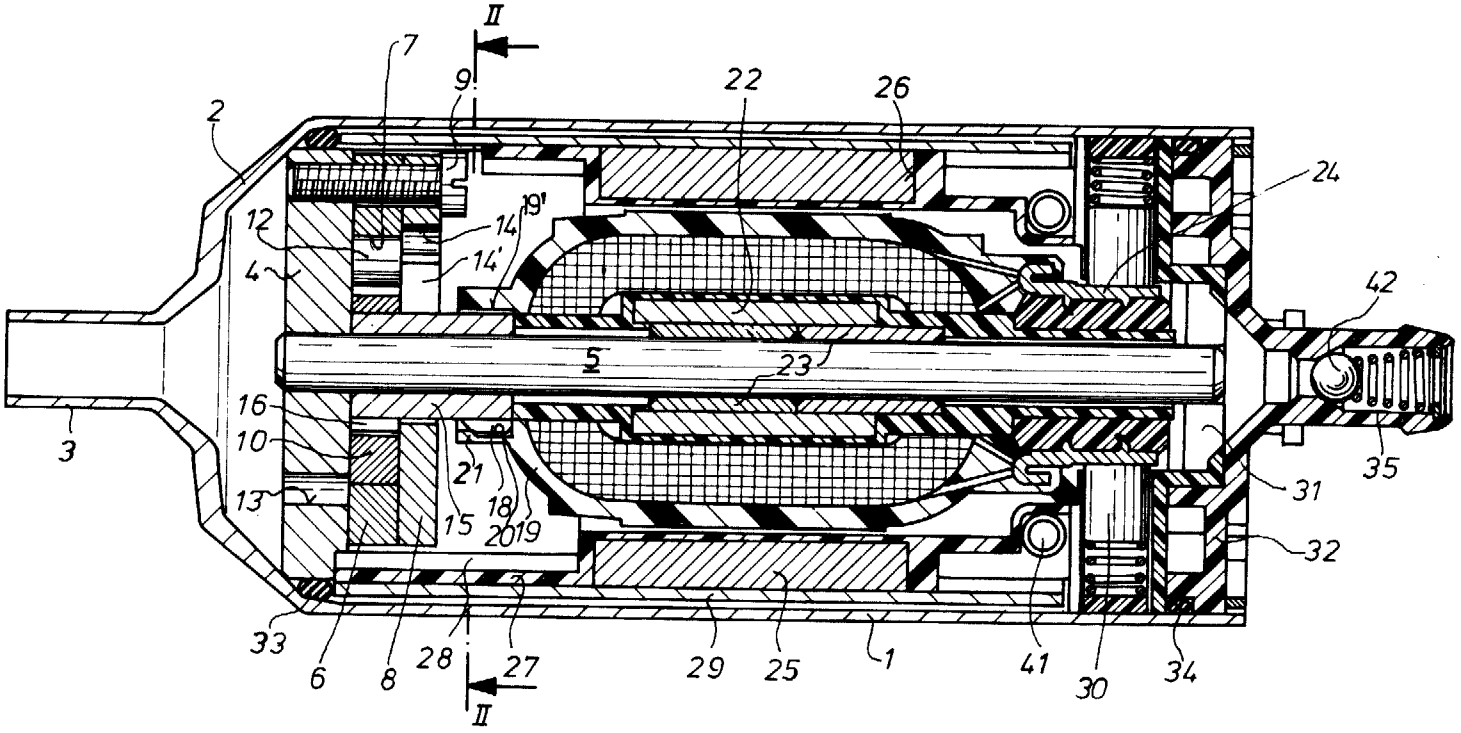
FIG. 1 is a longitudinal sectional view of the first embodiment of the invention.
Figure 2:
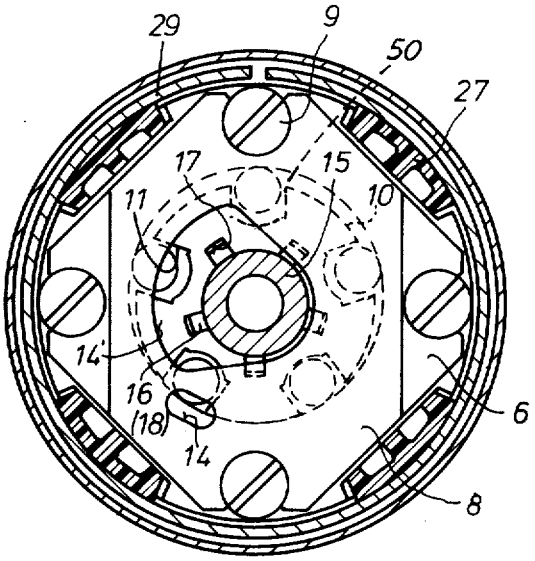
FIG. 2 is a cross-sectional view alone line II—II of FIG. 1.

Turning now to FIGS. 1 and 2, the pump assembly comprises two principal components: an electromotor and a pump proper, both accommodated in an external housing 1 which has a cylindrical shape and is, at one end, provided with a funnel-like terminus 2. In the center of the latter there is arranged an integral, outwardly extending inlet nipple 3.

Within the housing 1, on the funnel-shaped terminus 2 there is positioned a circular metal disc 4 which supports a stationary shaft 5 press-fitted at one end concentrically into the disc 4. The latter and the metal shaft 5 — preferably both made of steel — form together the base body of the pump-and-motor unit.

For sealing the inner space of the pump-and-motor unit, between the periphery of the metal disc 4 and the inner wall of the housing 1 there is fitted an O-ring 33.

On the metal disc 4 there is disposed an intermediate plate 6 which contains a pump work chamber 7 formed as a throughgoing opening and a closure plate 8. The metal disc 4, the intermediate plate 6 and the closure plate 8 are tightened to one another in a fluid-tight manner by means of bolts 9 and constitute together the pump housing.

The pump work chamber 7 has a cylindrical inner wall and is arranged slightly eccentrically with respect to the fixed shaft 5. In the pump work chamber 7 there is situated for rotation a pump rotor member 10 disposed in axial alignment with the shaft 5. The diameter of the rotor member 10 is so designed that it almost contacts the inner wall of the pump work chamber 7 to be in a fluid-tight relationship therewith. Thus, between the rotor member 10 and the inner wall of the pump work chamber 7 there is formed a sickle-shaped delivery chamber 50, best seen in FIG. 2. In radial slots 11 (FIG. 2) of the pump rotor member 10 there are disposed rollers 12 dividing, in a known manner, the delivery chamber into individual cells which, during the rotation of the rotor member 10, alternately expand and contract.

The suction side of the pump component communicates through an opening 13 in the metal disc 4 with the inlet nipple 3. The pressure side of the pump component communicates through openings 14, 14' in the closure plate 8 with the motor chamber of the unit which is adjoining the pump component and in which there is disposed the armature assembly 19 of the electromotor.

The pump rotor member 10 is inserted on a driving sleeve 15 which, in turn, journals on the shaft 5. At the periphery of the driving sleeve 15 there are provided five resilient projections 16 which serve to transmit the torque from the driving sleeve 15 to the pump rotor member 10. Accordingly, the projections 16 extend into five complemental grooves 17 provided in the inner wall of a central opening of the pump rotor member 10.

The axial length of the projections 16 corresponds to the length of the rollers 12 which, in turn, are of the same length — aside from a slight play — as the thickness of the intermediate plate 6. Thus, the projections 16 extend from the metal disc 4 to the closure plate 8. In this manner the driving sleeve 15 is immobilized in an axial direction.

At the other end of the driving sleeve 15, which is remote from the pump component, there are provided projections 18 which are similar to projections 16. The aforenoted end of the driving sleeve 15, together with the projections 18, extend into a central, cylindrical passage 19' of the armature 19. The inner wall of the passage 19' is provided with axially parallel grooves 20 each receiving a projection 18. Each groove 20 has, at its end adjacent the mouth of the passage 19', an elevated portion 21, so that the projections 18 may snap therebehind upon the introduction of the driving sleeve 15 into the passage 19' during assembly. In this manner the armature 19 is prevented from axially shifting with respect to the driving sleeve 15.

The armature plates 22 are press-fitted as a stack 22 on two bearing sleeves 23. The latter are disposed approximately at the mid portion of the armature 19 that includes the collector 24. The two sleeves 23 constitute the main bearing of the rotary armature arranged on the fixed shaft 5. The entire armature 19 is, together with the solenoids wound over the armature plates and the collector, surrounded by a sprayed-on coating which includes the passage 19'.

The permanent magnets 25 forming part of the electromotor are inserted in outwardly open recesses 26 of a support structure 27 which is made of a synthetic material and which surrounds the armature in a tubular manner.

The support structure 27 which is reinforced by means of axially parallel webs 28 is secured in the housing 1 against rotation. On the support structure 27 there is inserted, with a slight force-fit, a tubular sheet metal member 29 which is made of a magnetically conductive material. The magnets 25 are thus permanently encased from all sides. Consequently, fragments from the usually very brittle permanent magnets 25 cannot fall into the motor chamber and thus cannot interfere with the rotation of the armature 19.

In the support structure 27, at its portion surrounding the collector 24, there are provided support means for the carbon brushes 30, the suppressor chokes 41, as well as all components necessary for conducting current.

In the support structure 27, along the terminus of the shaft 5 which is remote from the pump component, there are provided a plurality of ribs 31 which serve for the centering of the shaft 5.

The pump-and-motor unit is closed at its end remote from the funnel-like portion 2 of the housing 1 by means of a closure 32 which is in engagement with the support structure 27 and which is surrounded by an O-ring 34. An outlet nipple 35 containing a check valve 42 is integral with the closure 32 and extends outwardly therefrom. The closure 32 is inserted with a slight force fit on the support structure 27 which, in turn, is inserted on the metal disc 4 and is immobilized in its position by means of wedges (not shown) provided in the external housing 1.

The flow medium is drawn by the pump component through the intake nipple 3 and forced through the openings 14, 14' in the closure plate 8 into the motor chamber. The flowing medium cools the armature 19 and lubricates the bearing faces of the driving sleeve 15 and the bearing sleeves 23. The flow medium leaves the pump assembly through the outlet nipple 35.

Figure 3:
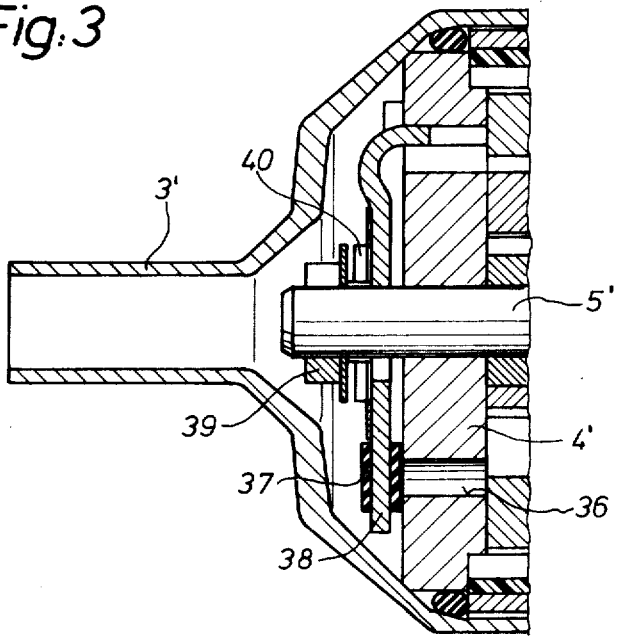
FIG. 3 is a longitudinal sectional view of the pump component of the second embodiment of the invention.

Turning now to FIG. 3, the embodiment shown therein corresponds substantially to that of the first embodiment. The difference resides in the provision of an additional overflow valve which is adapted to establish communication between the pressure side and the suction side of the pump component. For this purpose in the metal disc 4' there is provided a throughgoing port 36 which communicates with the pressure side of the pump. The opening 36 is closed by means of a valve flap 38 including a soft-elastic sealing body 17. The closing force is supplied by a flat spring 40 engaging a clamping ring 39 mounted on a projecting terminus of the stationary shaft 5'.

The aforedescribed overflow valve is incorporated in pump-and-motor units where a predetermined very narrow tolerance must not be exceeded.

The setting of the opening pressure of the overflow valve 38 may be set or changed even in an assembled condition of the pump assembly. For this purpose the clamping ring 39 is shifted axially by means of a tool introduced through the inlet nipple 3'.

It is a characteristic of the pump-and-motor unit according to the invention that the metal components (thus those which are less easily machinable) have a very simple configuration, whereas the components of more complicated shape are made of an easily machinable material such as a synthetic material.

That which is claimed is:

1. A pump-and-motor unit comprising, in combination:

A. an *elongated* external housing having an inlet opening *at one end* and an outlet opening *at the other end;*

B. a base body contained in said external housing and formed of 1. a metal disc secured [at one end] within said external housing *adjacent one of said openings* and
2. a stationary shaft affixed to said metal disc and extending within said external housing [substantially along the entire length thereof] *toward said other opening;*

C. an electrical motor including an armature [axially spaced from] *located between* said metal disc *and said other opening* and journaling on said stationary shaft and being exposed to the [flow of] liquid [medium through said pump-and-motor unit] *flowing from said inlet opening to said outlet opening;*

D. a pump rotor member disposed within said external housing; and

E. means rotationally coupling said pump rotor member to said armature.

2. A pump-and-motor unit as defined in claim 1, including

A. an intermediate plate in a face-to-face engagement with said metal disc,

B. a closure plate in a face-to-face engagement with said intermediate plate, and C. a pump work chamber accommodating said pump rotor member and constituted by a throughgoing opening provided in said intermediate plate, said pump work chamber bounded at one axial end by said metal disc and bounded at the other axial end by said closure plate.

3. A pump-and-motor unit as defined in claim 2, wherein said metal disc is made of sintered steel and said intermediate plate, said closure plate and said pump rotor member are made of a metal.

4. A pump-and-motor unit as defined in claim 2, wherein said intermediate plate, said closure plate and said pump rotor member are made of steel.

5. A pump-and-motor unit as defined in claim 1, said armature including

A. a collector ring disposed at one end of said armature,

B. at least one bearing sleeve surrounding said stationary shaft and slidably contacting the same, said bearing sleeve being disposed approximately along the mid portion of said armature with respect to the entire length thereof, C. a stack of armature plates press-fitted on said bearing sleeve, D. an armature coil surrounding said armature plates and E. a coating of synthetic material forming the external, encompassing casing of said armature.

6. A pump-and-motor unit as defined in claim 1, said means rotationally coupling said pump rotor member to said armature being formed of a driving sleeve surrounding said stationary shaft and having driving means at both ends, said driving means being in rotationally coupling engagement with said armature and with said pump rotor member.

7. A pump-and-motor unit as defined in claim 6, wherein said driving means forming part of said driving sleeve includes two sets of projections arranged circumferentially at both axial end portions of said driving sleeve, one set of said projections engaging said pump rotor member, said last-named projections having an axial length substantially equal to that of said pump rotor member, the other set of said projections engaging complemental axial grooves formed in said armature, the axial length of said last-named projections being substantially equal to that of said axial grooves, the outer axial end of each projection being flush with the radial terminal face of the associated end portion of said driving sleeve.

8. A pump-and-motor unit as defined in claim 7, wherein each complemental axial groove formed in said armature contains a radially inwardly projecting elevated portion snapping behind the corresponding projection of the set associated with said armature for securing the latter against axial displacement with respect to said driving sleeve.

9. A pump-and-motor unit as defined in claim 1, including

A. a support structure made of synthetic material and surrounding said armature in a tubular manner within said external housing, said support structure containing outwardly open recesses arranged circumferentially, B. a plurality of permanent magnets forming part of said electric motor and disposed in said recesses and C. a tubular sheet metal member made of a magnetically conductive material and surrounding support structure within said external housing.

10. A pump-and-motor unit as defined in claim 1, including an inlet nipple formed as an internal component of said external housing.

11. A pump-and-motor unit as defined in claim 1, including an outlet nipple containing a check valve.

12. A pump-and-motor unit as defined in claim 1, further including

A. a throughgoing port provided in said metal disc, said port connecting the pressure side of said pump rotor member with the inlet of the pump-and-motor unit, B. a flap valve, including a soft-elastic sealing body cooperating with said port, C. a spring urging said flap valve into contact with said metal disc to close said port, and D. a clamping ring secured to an end portion of said stationary shaft and serving as a support for said spring, said last-named end portion projecting beyond said metal disc in a direction away from said armature.

*13. A pump-and-motor unit comprising, in combination:*

*A. an elongated housing having a liquid-admitting inlet end and an opposite liquid-discharging outlet end;*

*B. a shaft fixedly mounted in said housing;*

*C. a pump installed in said housing adjacent one of said ends and including a first rotor mounted on and rotatable relative to said shaft to thereby cause liquid to flow from said liquid-admitting inlet end to said liquid discharging-outlet end;*

*D. an electric motor installed in said housing between said pump and said other end and having a second rotor mounted on and rotatable relative to said shaft and being exposed to the liquid flowing from said liquid-admitting inlet end to said liquid-discharging outlet end; and*

*E. elastic torque-transmitting means connecting said rotors.*

* * * * *